(12) United States Patent
Aoki et al.

(10) Patent No.: US 6,843,502 B2
(45) Date of Patent: Jan. 18, 2005

(54) OCCUPANT RESTRAINT SYSTEM

(75) Inventors: Takashi Aoki, Wako (JP); Hidetoshi Utsumi, Wako (JP); Fumiharu Ochiai, Wako (JP); Naohiko Saita, Wako (JP); Yuichi Saito, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/164,294

(22) Filed: Jun. 6, 2002

(65) Prior Publication Data

US 2003/0006588 A1 Jan. 9, 2003

(30) Foreign Application Priority Data

Jun. 11, 2001 (JP) .................................... 2001-175069
Jun. 11, 2001 (JP) .................................... 2001-175070

(51) Int. Cl.[7] ............................................. B60R 21/20
(52) U.S. Cl. ............................. 280/730.2; 280/743.1
(58) Field of Search ........................ 280/730.2, 730.1, 280/743.1

(56) References Cited

U.S. PATENT DOCUMENTS

| 6,079,732 A | | 6/2000 | Nakajima et al. | |
|---|---|---|---|---|
| 6,530,594 B1 | * | 3/2003 | Nakajima et al. | 280/730.2 |
| 6,530,595 B2 | * | 3/2003 | Masuda et al. | 280/730.2 |
| 6,554,314 B1 | * | 4/2003 | Uchiyama et al. | 280/730.2 |
| RE38,125 E | * | 5/2003 | Shibata et al. | 280/730.2 |
| 6,565,116 B1 | * | 5/2003 | Tajima et al. | 280/730.2 |
| 6,575,496 B2 | * | 6/2003 | Hess et al. | 280/730.2 |
| 6,595,546 B2 | * | 7/2003 | Smith | 280/736 |
| 2001/0000290 A1 | * | 4/2001 | Nakajima et al. | 280/730.2 |

FOREIGN PATENT DOCUMENTS

| DE | 29614201 U1 | 11/1996 |
|---|---|---|
| DE | 19718203 | 5/1999 |
| DE | 29716793 U | 1/2001 |
| DE | 20012115 U | 1/2002 |
| JP | 11-235965 | 8/1999 |
| JP | 2000-033847 | 2/2000 |

* cited by examiner

Primary Examiner—Teri P. Luu
Assistant Examiner—Bret Hayes
(74) Attorney, Agent, or Firm—Carrier, Blackman & Associates, P.C.; Joseph P. Carrier; William D. Blackman

(57) ABSTRACT

An occupant restraint system includes a side airbag and an inflator. The airbag includes six cells that are defined by stitching and are adapted to be inflated by a gas generated by the inflator. Among six end parts a to f of these cells, four end parts b to e are positioned on top of or in the vicinity of a center pillar garnish and a rear pillar garnish that include respective impact absorbing ribs. When the airbag is deployed, even if the end parts b to e cannot be inflated sufficiently due to the stitching, thereby exhibiting no impact-absorbing effect, the center pillar garnish and the rear pillar garnish instead exhibit an impact-absorbing effect, thereby protecting an occupant.

18 Claims, 16 Drawing Sheets

OCCUPANT RESTRAINT SYSTEM

BACKGROUND OF THE INVENTION

1. Field of the Invention

The present invention relates to an occupant restraint system in which a side airbag is disposed in a folded state along an upper edge of a door opening of a vehicle body, and the airbag is inflatable by a gas, generated by an inflator, when the vehicle is involved in a collision. Upon activation thereof, the airbag is deployed in a curtain shape along the inner face of a side of an occupant compartment.

2. Description of the Related Art

Such an occupant restraint system is known in, for example, Japanese Patent Application Laid-open Nos. 2000-33847 and 11-235965. The airbag of this type of occupant restraint system is folded in a zigzag manner along fold lines extending in the longitudinal direction and designed so that it deploys when a gas is supplied to a plurality of cells extending downward from an upper communicating passage extending to an inflator.

The cells of the airbag are defined by sewing two fabrics superimposed one on top of the other, the parts interposed between adjoining lines of stitching forming cells, which are inflated by the gas that flows in. As a result, the cell end parts, formed by the point where the stitching stops, cannot be inflated sufficiently since the two sheets of fabric are united by sewing, and there is a possibility that these parts might have an insufficient impact-absorbing effect.

Furthermore, if the upper ends of the cells extending to the upper communicating passage of the airbag are aligned along one of the fold lines, in some cases the pressure of the gas inflating the airbag might be distributed equally to all of the cells, resulting in individual cells becoming bent in two at the center in the vertical direction, and preventing smooth deployment.

SUMMARY OF THE INVENTION

The present invention has been carried out in view of the above-mentioned circumstances, and it is a first object of the present invention to compensate for an insufficient impact-absorbing effect at the cell end parts of an airbag.

In order to accomplish the first object, a first aspect of the present invention proposes an occupant restraint system in which an airbag is disposed in a folded state along an upper edge of a door opening of a vehicle body, and the airbag is adapted to be inflated by a gas, generated by an inflator, when the vehicle is involved in a collision. Upon activation thereof, the airbag is deployed in a curtain shape along the inner face of a side of an occupant compartment.

The airbag according to the invention includes a plurality of cells that are defined by a connecting part. The cells are inflatable by the gas generated by the inflator when the airbag is deployed, and at least one of the end parts of the cells is positioned in the vicinity of an impact absorbing member.

In accordance with this arrangement, since at least one of the end parts of the cells that are inflated by the gas generated by the inflator is positioned in the vicinity of the impact absorbing member, even if said at least one of the end parts cannot be inflated sufficiently due to the connecting part (thereby exhibiting no impact-absorbing effect), the impact-absorbing effect is instead exhibited by the impact absorbing member, thereby protecting an occupant.

The connecting part of the present invention corresponds to stitching 27 in particular disclosed embodiments, and one aspect of an impact absorbing member according to the present invention corresponds to a center pillar garnish 53, a rear pillar garnish 61, and/or a front pillar garnish 64.

A second object of the present invention is to smoothly deploy an airbag that has a plurality of cells and is folded along fold lines.

In order to accomplish the second object, a second aspect of the present invention proposes an occupant restraint system in which an airbag is disposed in a folded state along an upper edge of a door opening of a vehicle body and the airbag is inflated by a gas generated by an inflator when the vehicle is involved in a collision so that it is deployed in a curtain shape along the inner face of a side of an occupant compartment, wherein the airbag includes a plurality of cells that are inflatable by the gas generated by the inflator, and the end parts of the cells are non-vertically aligned relative to a fold line of the airbag, extending in the longitudinal direction of the vehicle.

In accordance with this arrangement, since the end parts of the cells that are inflated by the gas generated by the inflator are not vertically aligned relative to the fold line of the airbag extending in the longitudinal direction of the vehicle, the timing of the gas flowing into the end parts of the plurality of cells is staggered, thus preventing the individual cells from bending in two at the center in the vertical direction, and thereby smoothly deploying the airbag.

The above-mentioned objects, as well as other objects, characteristics and advantages of the present invention will become apparent from an explanation of preferred embodiments that will be described in detail below by reference to the attached drawings.

BRIEF DESCRIPTION OF THE DRAWINGS

FIG. 1 is a perspective view showing an interior of the occupant compartment of an automobile.

FIG. 2 is a view corresponding to FIG. 1, showing a state in which an airbag of an occupant restraint system has been deployed.

FIG. 3 is a magnified view of the occupant restraint system in which the airbag has been deployed.

FIG. 4 is an exploded perspective view of the occupant restraint system.

FIG. 5 is a magnified cross section along line 5—5 of FIG. 1.

FIG. 6 is a magnified cross section along line 6—6 of FIG. 1.

FIG. 7 is a magnified cross section along line 7—7 of FIG. 1.

FIG. 8 is a magnified cross section along line 8—8 of FIG. 1.

FIG. 9 is a magnified cross section along line 9—9 of FIG. 3.

FIG. 10 is a magnified cross section along line 10—10 of FIG. 5.

FIG. 11 is a view from arrow 11 of FIG. 4.

FIG. 12 is a view from arrow 12 of FIG. 7.

FIG. 13 is a view corresponding to FIG. 2.

FIG. 14 is a magnified view of section 14 in FIG. 13.

DESCRIPTION OF PREFERRED EMBODIMENTS

The first embodiment of the present invention is explained by reference to FIGS. 1 to 12.

Figure 1:
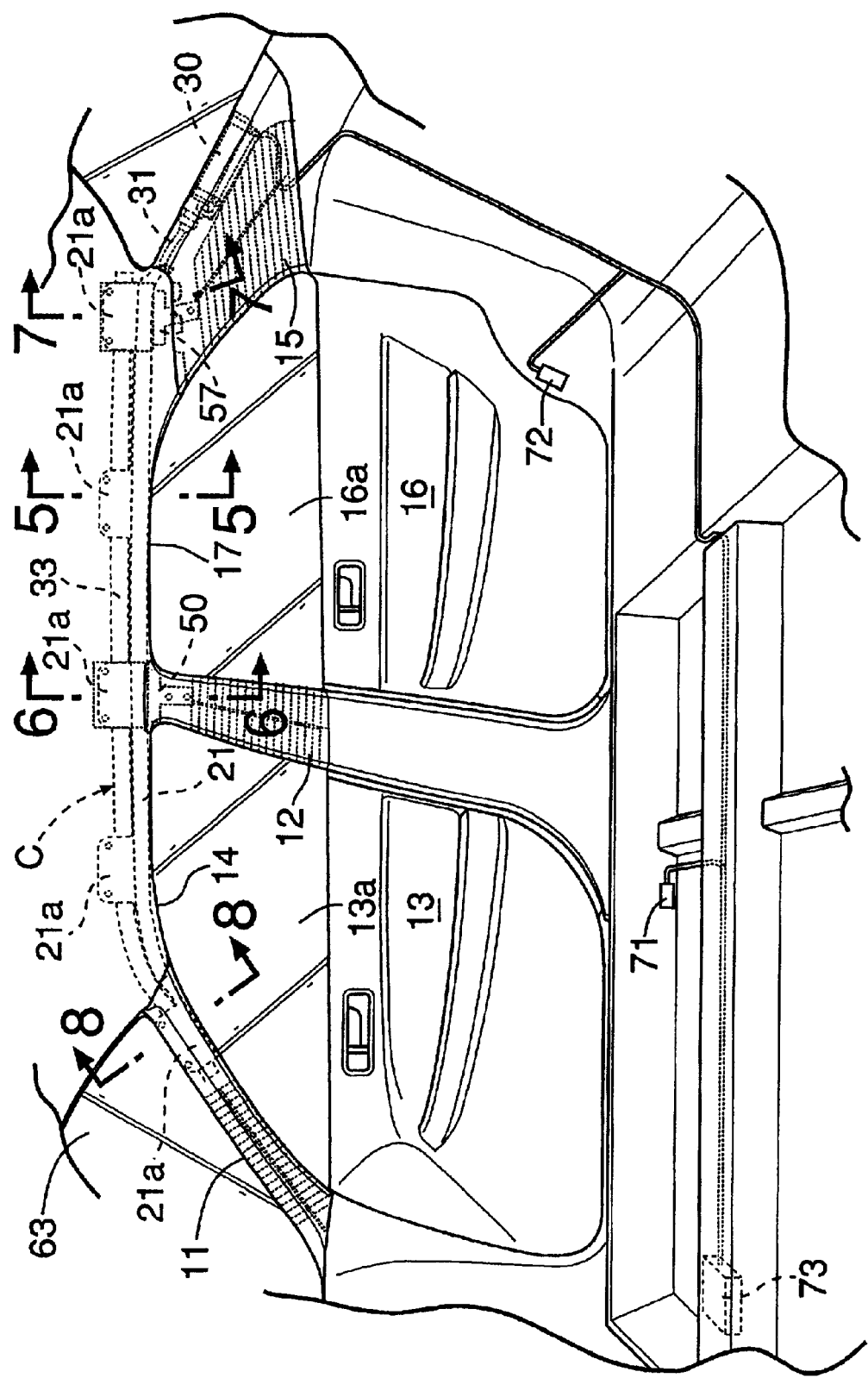
FIGS. 1 to 12 show a first embodiment of the present invention.

Referring to FIG. 1, formed between a front pillar 11 and a center pillar 12 on a vehicle body side face is a door opening 14 in which a front door 13 is mounted, and formed between the center pillar 12 and a rear pillar 15 is a door opening 17 in which a rear door 16 is mounted. A roof side rail 18 (see FIG. 5) extends in the longitudinal direction of the vehicle body, so as to provide a connection between the upper end of the front pillar 11 and the upper end of the rear pillar 15. The roof side rail 18 defines the upper edges of the door openings 14 and 17 of the front door 13 and the rear door 16. An occupant restraint system C is provided along the roof side rail 18. The occupant restraint system C is provided on each of the left and right sides of the vehicle body. The occupant restraint systems on the respective left and right sides have a substantially identical mirror-image structure, and that provided on the right side of the vehicle body is explained below as being representative thereof.

Figure 2:
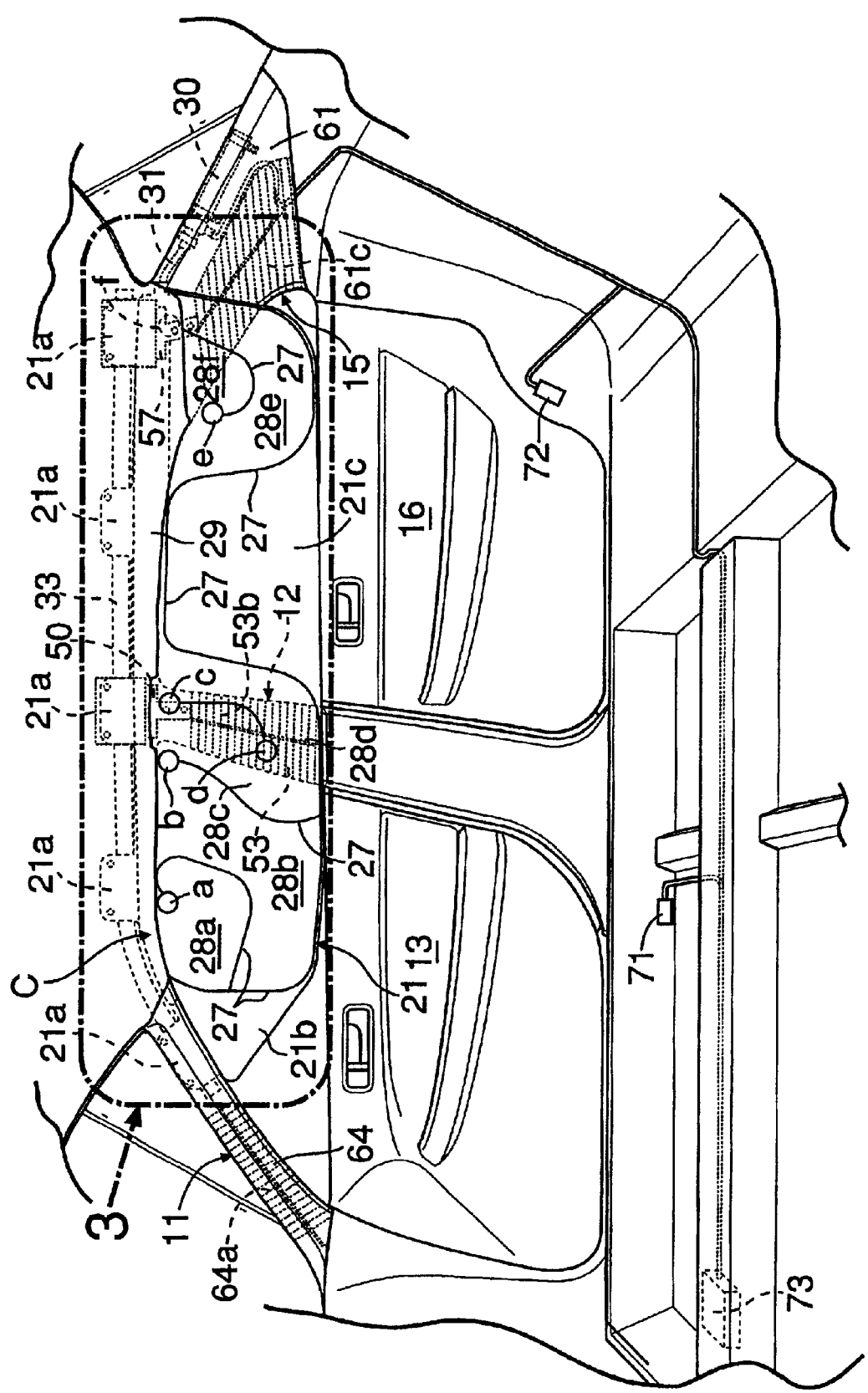

Turning to FIG. 2, when an acceleration equal to or greater than a predetermined value is detected when the vehicle is involved in a side collision or a rollover, an airbag 21 of the occupant restraint system C is deployed downward in a curtain shape from the upper edges of the door openings 14 and 17, so as to block occupants seated in front and rear seats from impacting against the inner side face of the vehicle body, that is to say, the front pillar 11, the center pillar 12, the rear pillar 15, a door glass 13a of the front door 13, and/or a door glass 16a of the rear door 16.

Figure 3:
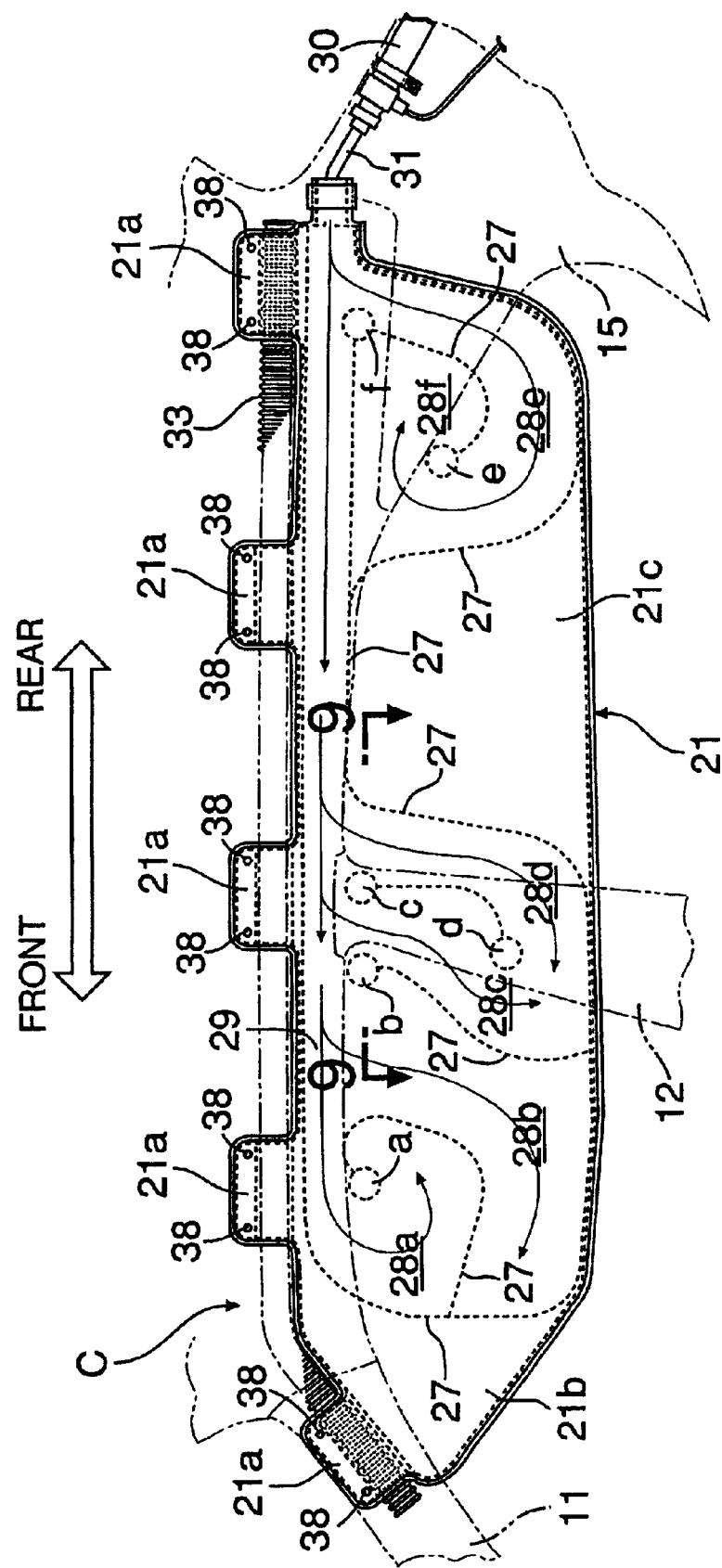
Figure 9:
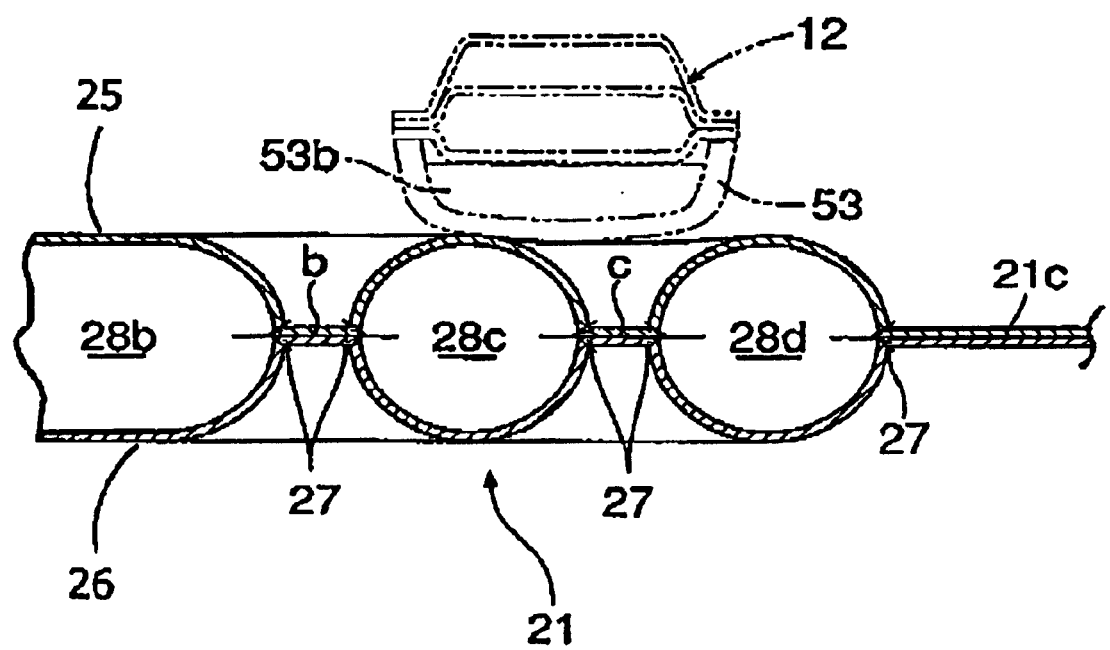

As shown in FIG. 3, the airbag 21 extending in the longitudinal direction of the vehicle body is formed by sewing with stitching 27 a first base fabric 25 and a second base fabric 26 superimposed one on top of the other, the two having substantially the same shape (see FIG. 9). The stitching 27 forms a plurality of (for example, six) cells 28a to 28f and an upper communicating passage 29, which is in fluid communication with the cells. In the embodiment of FIG. 3, the cells are non-parallel. The shape of the cells 28a to 28f is not uniform and can be formed into a J-shape or a U-shape by curved lines of stitching 27. The front end of a gas supply pipe 31 extending forward from an inflator 30 housed within the rear pillar 15 is inserted within the upper communicating passage 29. The six cells 28a to 28f branch downward from the upper communicating passage 29. The part via which the gas supply pipe 31 is inserted within the upper communicating passage 29 is secured by means of a metal band, etc. and sealed in a gas-tight manner. The end parts a to f of the six cells 28a to 28f are sewn in the shape of a small circle, in order to prevent the sewing thread from snapping and to increase the strength.

Positions of the airbag 21 that correspond to the rear side of the front pillar 11 and the rear side of the center pillar 12 are provided with non-inflatable sections 21b and 21c where no cells 28a to 28f are formed.

Provided along the upper edge of the airbag 21 are a plurality of (for example, five) impact absorbing member supports 21a, and an impact absorbing member 33, which is a corrugated pipe, is integrated with the airbag 21 by means of the impact absorbing member supports 21a.

Figure 10:
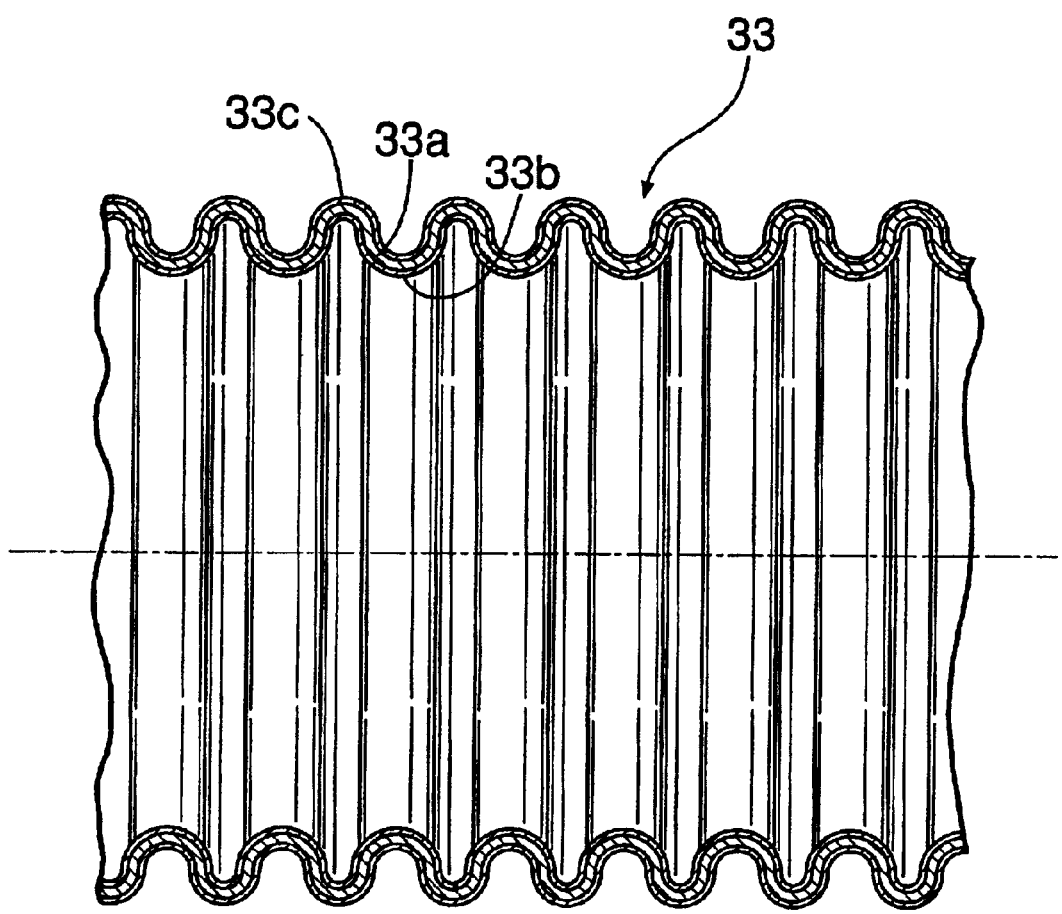

As shown in FIG. 10, the impact absorbing member 33 is formed into a bellows having a circular cross section by laminating a central main body 33a made of aluminum and inner and outer coverings 33b and 33c made of paper, and it can be made to collapse by an external load, thereby exhibiting an effective impact-absorbing effect.

Figure 5:
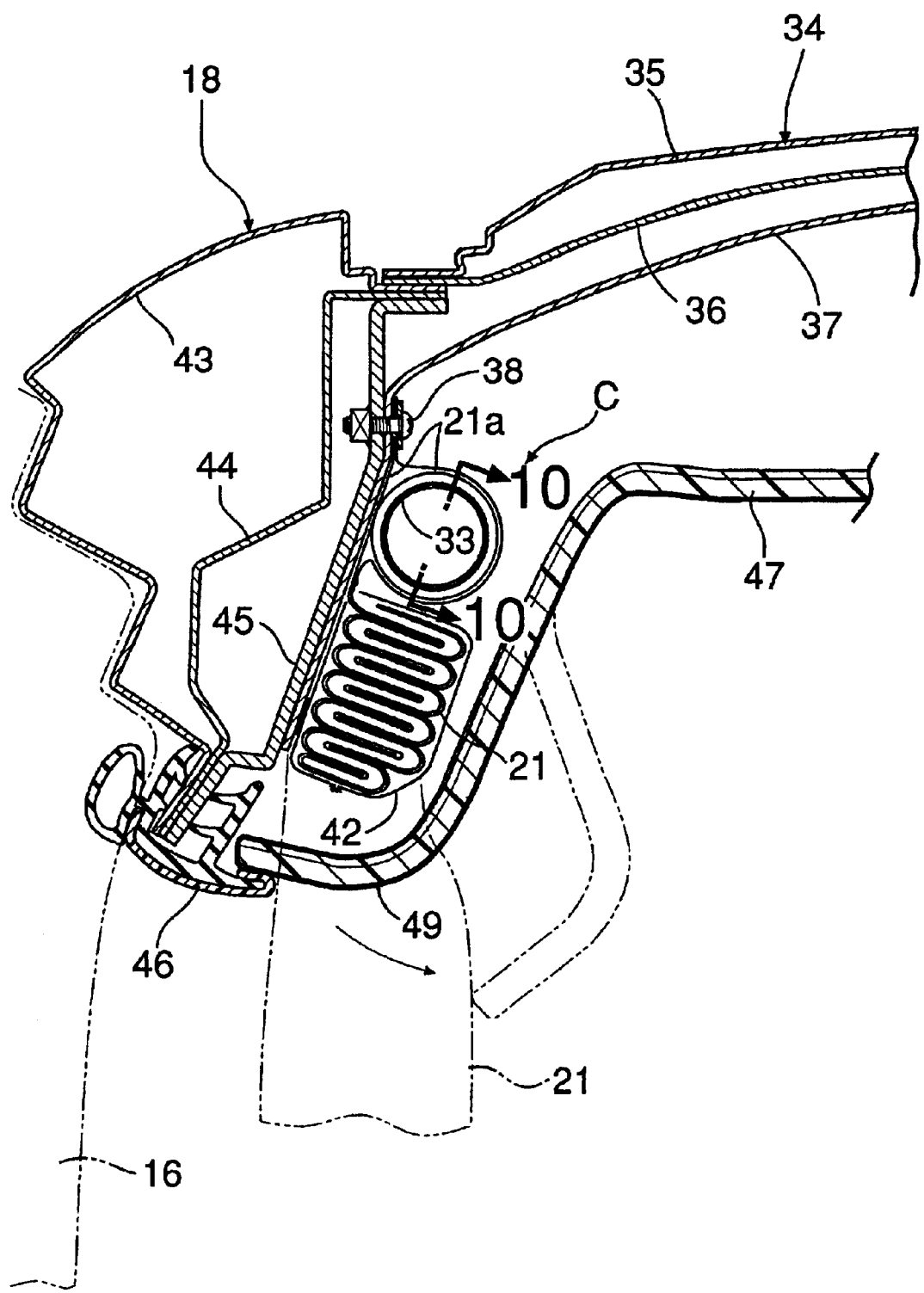
Figure 6:
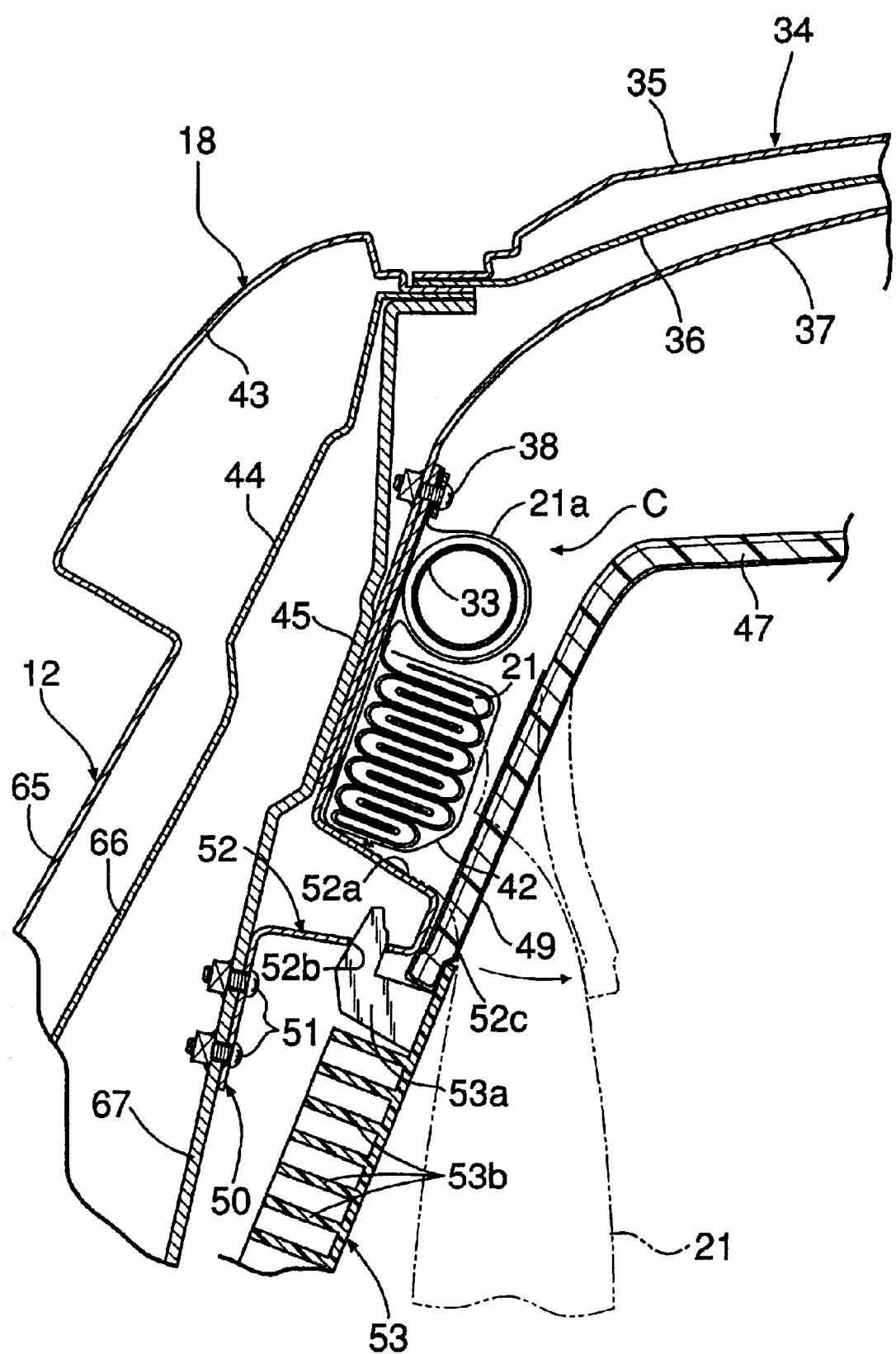
Figure 7:
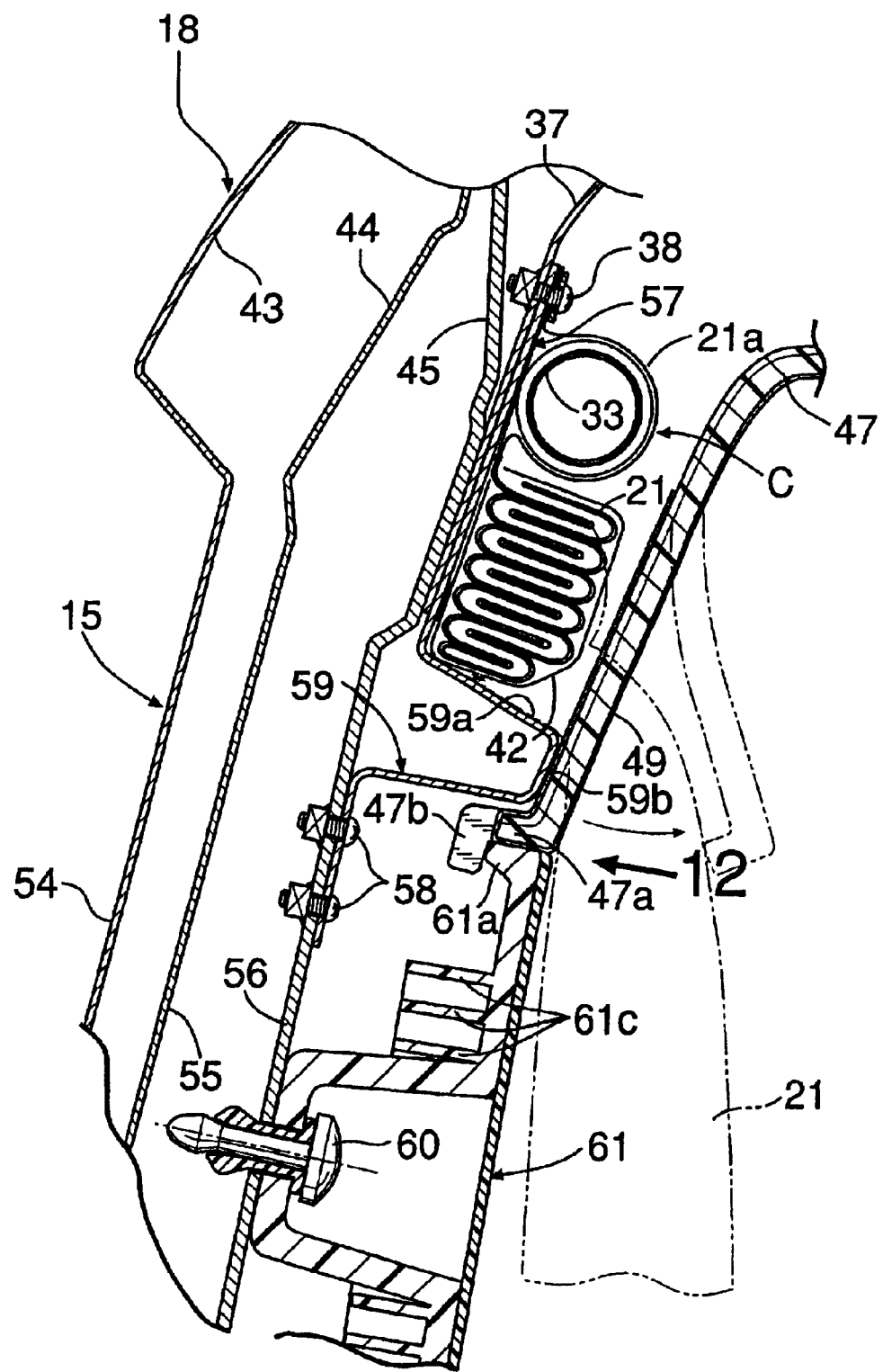

A roof 34 is formed from an outer member 35, a center member 36, and an inner member 37, and the upper ends of the four impact absorbing member supports 21a on the rear side of the airbag 21 are each fixed to the inner member 37 by means of two bolts 38 (see FIGS. 5 to 7). The front pillar 11 is formed from an outer member 39, a center member 40, and an inner member 41, and the upper end of the impact absorbing member support 21 a on the front end of the airbag 21 is fixed to the inner member 41 by means of two bolts 38 (see FIG. 8).

Since the folded airbag 21 and the impact absorbing member 33 are integrated in advance to form a module in this way, the mounting operation therefor becomes easy in comparison with a case where they are individually mounted in the vehicle body, thereby enhancing the operational efficiency and the precision of assembly. Moreover, since both the folded airbag 21 and the corrugated pipe impact absorbing member 33 are flexible, they can be placed easily along the curved roof side rail 18.

Figure 4:
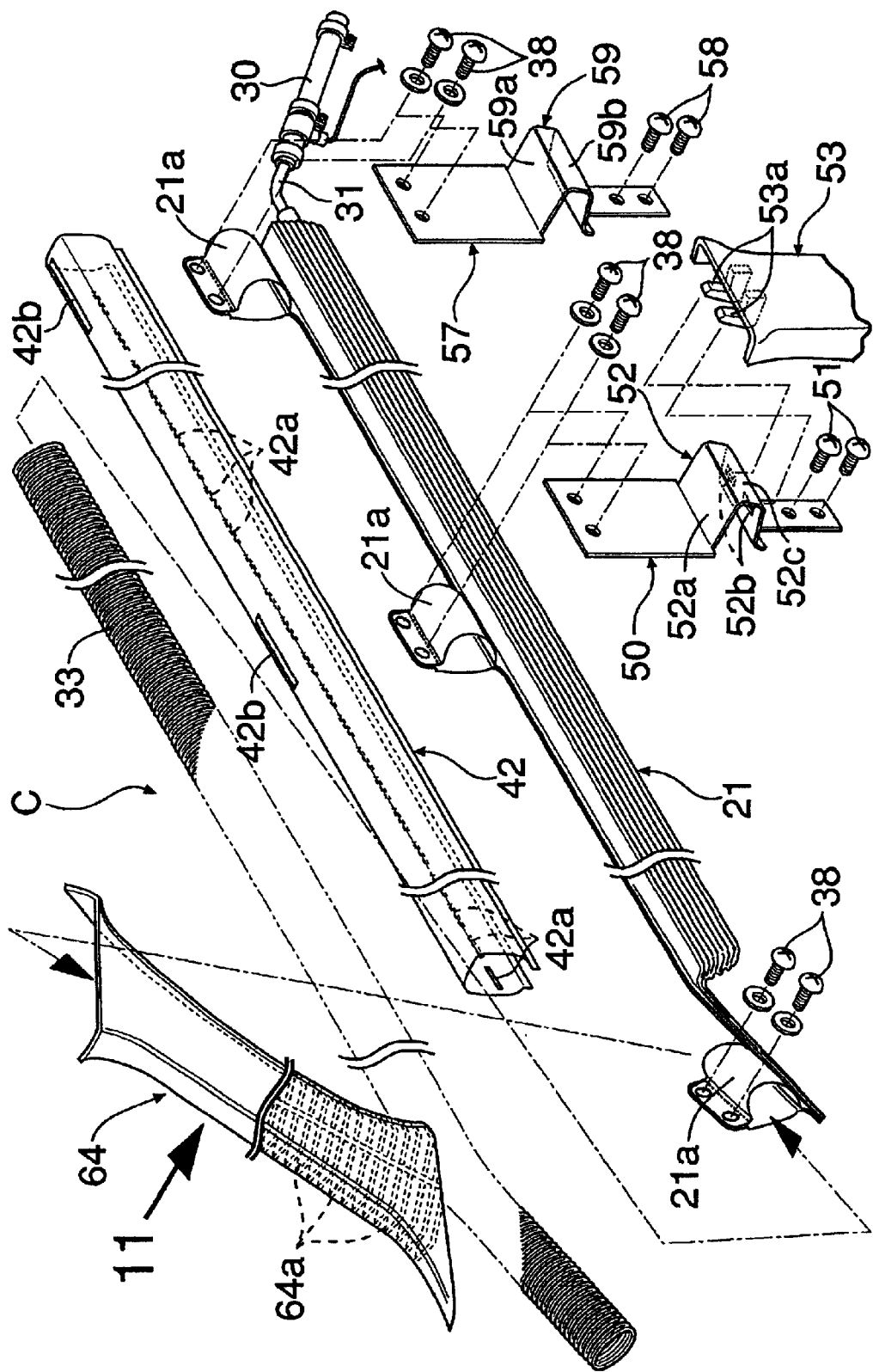

As is clear from FIG. 4, the folded airbag 21 is housed within an airbag cover 42 formed from a nonwoven fabric. The airbag cover 42 is made by sewing along the lower edges of a tube formed from a rectangular piece of cloth, and includes, on the side facing the roof side rail 18, perforation slits 42a that can be ruptured easily. The impact absorbing member supports 21a projecting from the upper end of the airbag 21 pass through openings 42b formed on the upper face of the airbag cover 42 and project upward.

As is clear from FIG. 5, a weather strip 46 is provided on the lower end of the roof side rail 18 formed from an outer member 43, a center member 44, and an inner member 45. The weather strip 46 can make contact with the rear door 16 (or the front door 13). The edge of a synthetic resin roof garnish 47 positioned along the lower face of the roof 34 latches on the edge of the weather strip 46 projecting from the lower end of the roof side rail 18 toward the occupant compartment. The occupant compartment-facing lower face of the roof garnish 47 is covered with a skin material 49, and this skin material 49 is wrapped around the edge of the roof garnish 47 from the lower face side to the upper face side. It is possible thereby to prevent the edge of the synthetic resin roof garnish 47 from splitting and shattering when it is exposed to an impact.

As is clear from FIGS. 4 and 6, the center pillar 12 extending downward from the roof side rail 18 is formed from an outside panel 65, a stiffener 66, and a center pillar inner 67. A front bracket 50 is mounted extending from the inner member 37 of the roof 34 to the center pillar inner 67 of the center pillar 12. The front bracket 50 is formed by bending a metal sheet; its upper part is superimposed on and, together with the impact absorbing member support 21a of the airbag, fixed to the inner member 37 of the roof 34 by means of two bolts 38, and its lower part is fixed to the center pillar inner 67 of the center pillar 12 by means of two bolts 51.

A projection 52 is formed in the middle section of the front bracket 50 projecting toward the occupant compartment. A guide surface 52a, formed on the upper face of the projection 52, faces the lower end of the folded airbag 21. A pair of latches 53a, projectingly provided on the inner face of an upper part of the center pillar garnish 53, engage with two latching holes 52b formed in the lower face of the projection 52. Formed on the inner face of the center pillar garnish 53 are a large number of impact absorbing ribs 53b (see FIGS. 2 and 6) in order to absorb the impact of a secondary collision with an occupant.

The upper part of the center pillar garnish 53 can thereby be fixed to the center pillar 12 without employing a special clip, etc. and, moreover, the center pillar garnish 53 can be fixed more securely in comparison with the case where a clip is employed. The lower edge of the roof garnish 47 is fixedly interposed between the top face 52c of the projection 52 of the front bracket 50 and the inner face at the upper end of the center pillar garnish 53.

Figure 12:
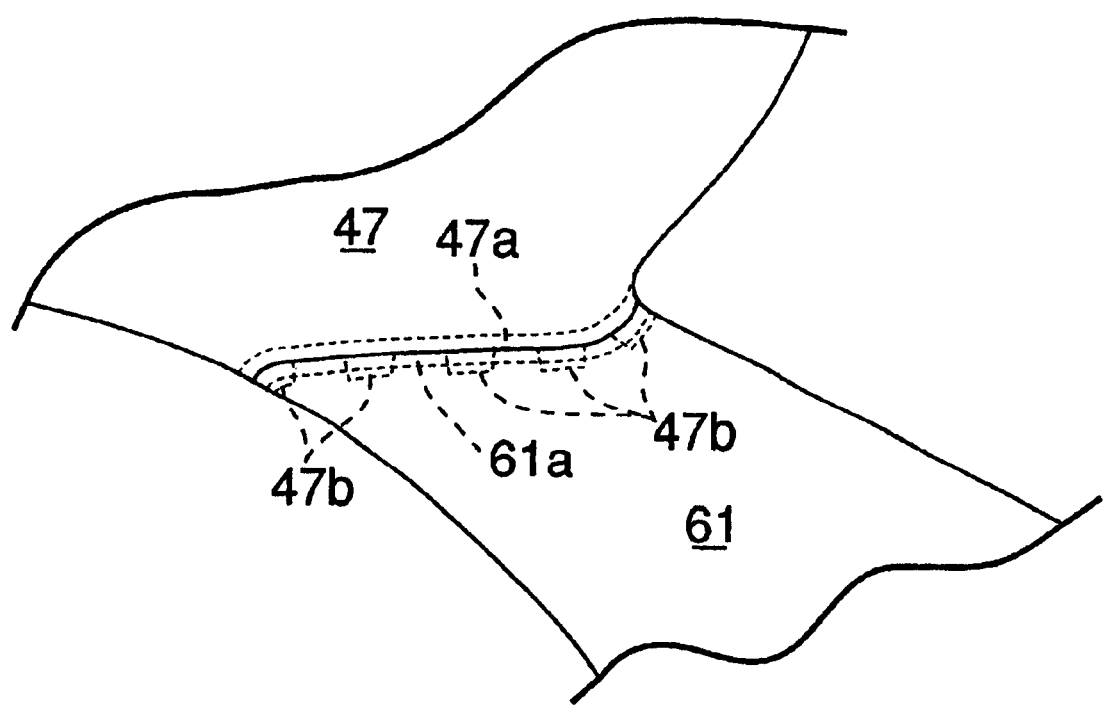

As is clear from FIGS. 4, 7 and 12, the rear pillar 15 extending downward from the roof side rail 18 is formed from an outer member 54, a center member 55, and an inner member 56, and a rear bracket 57 is mounted extending from the inner member 37 of the roof 34 to the inner member 56 of the rear pillar 15. The rear bracket 57 has substantially the same shape as that of the front bracket 50; its upper part is superimposed on and, together with the impact absorbing member support 21a of the airbag 21, fixed to the inner member 37 of the roof 34 by means of two bolts 38, and its lower part is fixed to the inner member 56 of the rear pillar 15 by means of two bolts 58. Formed in the middle section of the rear bracket 57 is a projection 59 projecting toward the occupant compartment, and a guide surface 59a formed on the upper face of the projection 59 faces the lower end of the folded airbag 21.

A rear pillar garnish 61 is fixed to the inner member 56 of the rear pillar 15 by means of a clip 60 and has on its upper end a flange 61a bending toward the outside of the vehicle body, and formed on the lower edge of the roof garnish 47 is a flange 47a that abuts the flange 61a of the rear pillar garnish 61. The flange 47a of the roof garnish 47 has a plurality of (five in the embodiment) latches 47b projecting downward, and these latches 47b engage with the reverse face of the flange 61a of the rear pillar garnish 61. Formed on the inner face of the rear pillar garnish 61 are a large number of impact absorbing ribs 61c (see FIGS. 2 and 7) in order to absorb the impact of a secondary collision with an occupant.

Figure 8:
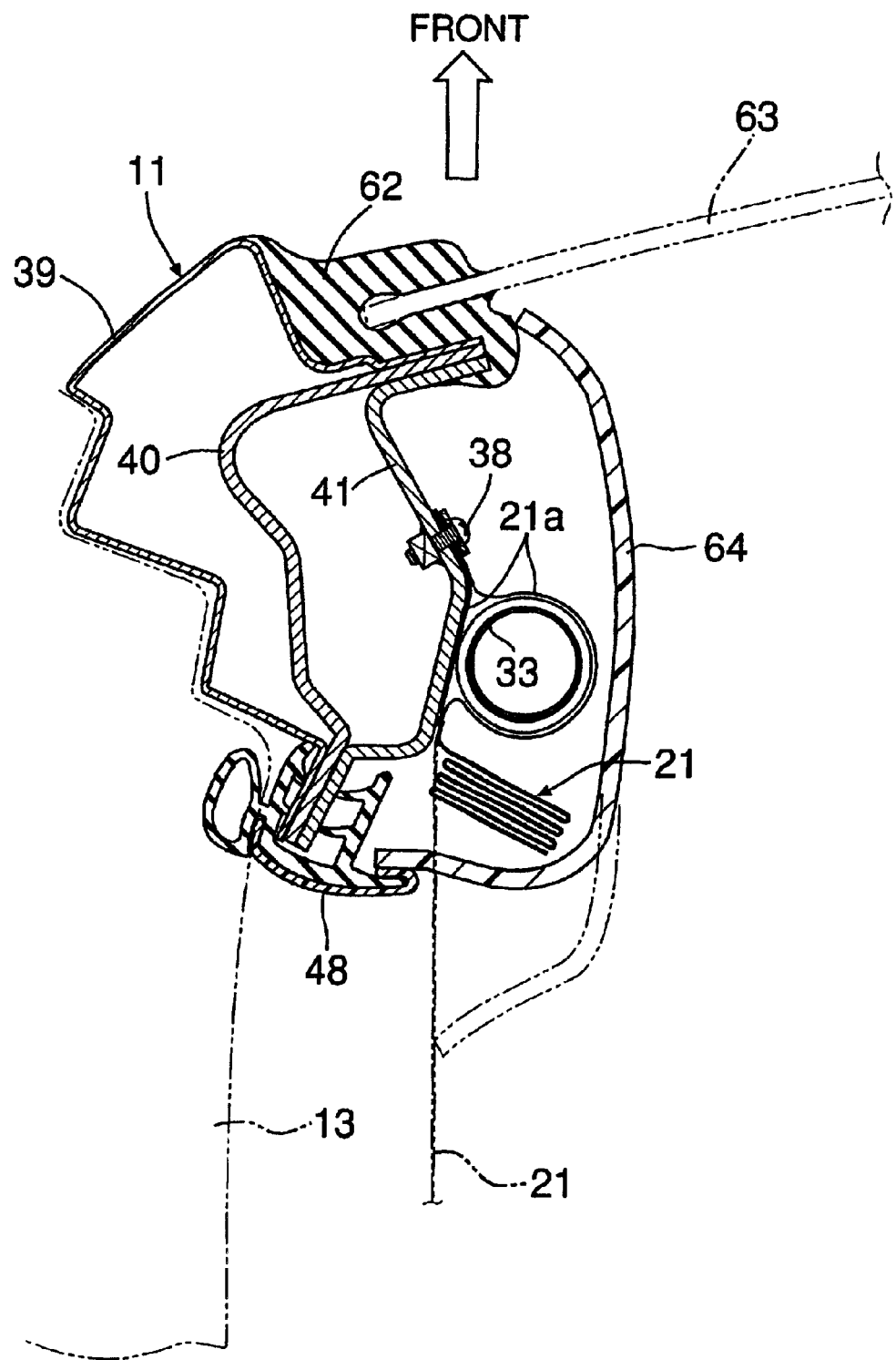
Figure 11:
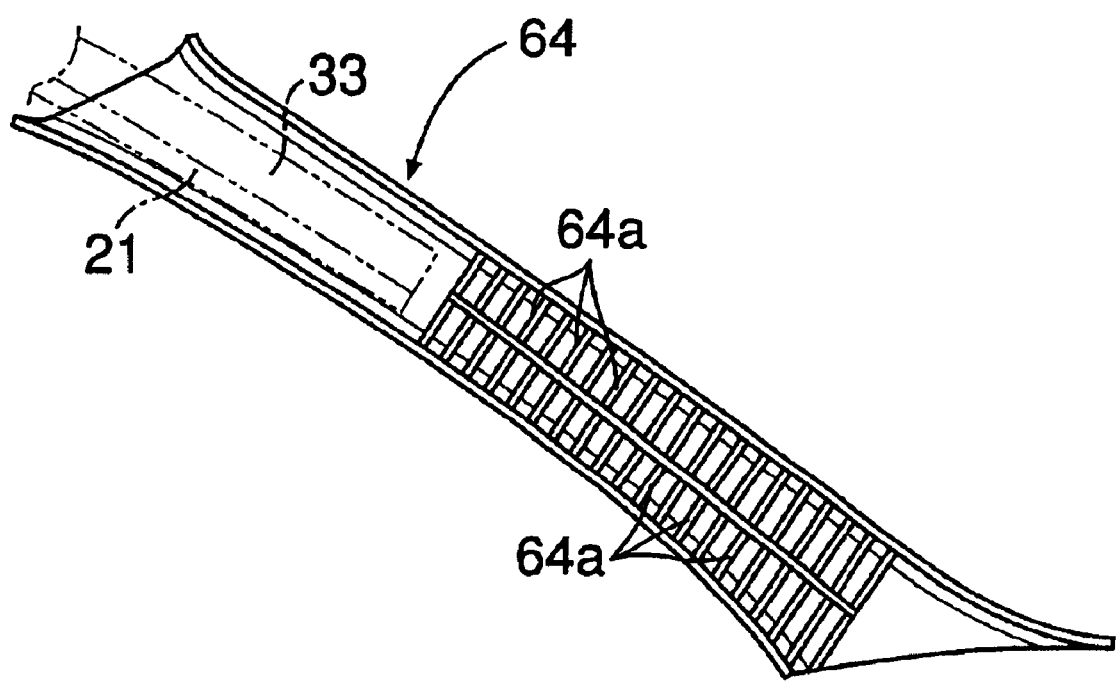

As shown in FIGS. 2, 8 and 11, a side edge of a front glass 63 is supported on the front face of the front pillar 11 via a rubber member 62, and mounted between the rubber member 62 and a weather strip 48 provided on the rear face of the front pillar 11 is a front pillar garnish 64 having an arc-shaped curved cross section. The upper half of the front pillar garnish 64 is hollow, and the folded non-inflatable part 21b on the front end of the airbag 21 and the front end part of the impact absorbing member 33 are housed therewithin. Integrally formed on the inner face of the lower half of the front pillar garnish 64, which houses neither the airbag 21 nor the impact absorbing member 33, are a large number of impact absorbing ribs 64a for absorbing an impact.

Housing the impact absorbing member 33 within the upper half of the front pillar garnish 64 and forming the large number of impact absorbing ribs 64a in the lower half of the front pillar garnish 64 in this way allows an impact absorbing effect to be exhibited over the whole length of the front pillar 11 while housing the front end part of the airbag 21 within the front pillar 11. Moreover, since no impact absorbing ribs 64a are formed in the upper half of the front pillar garnish 64 housing the front end part of the airbag 21, when the airbag 21 is deployed the front pillar garnish 64 can be easily flexed, thus enabling the airbag 21 to be smoothly deployed and thereby reliably preventing a part of the front pillar garnish 64 from splitting and shattering.

As shown in FIG. 1, a front side-collision sensor 71 and a rear side-collision sensor 72 are connected to an electronic control unit 73, and when the electronic control unit 73 detects a vehicle side collision (or a vehicle rollover) based on signals from the two acceleration sensors 71 and 72, the electronic control unit 73 outputs an operation signal to the inflator 30 so as to deploy the airbag 21.

Next, the action of the above-mentioned embodiment is explained.

When a vehicle side collision is detected, the inflator 30 operates, and the gas stored under pressure within the inflator 30 flows into the six cells 28a to 28f via the gas supply pipe 31 and the upper communicating passage 29, thus inflating the six cells 28a to 28f. Inflating the airbag 21 ruptures the slits 42a of the airbag cover 42, and the airbag 21 whose restraint has been released deploys downward.

As shown in FIG. 5, in the door openings 14 and 17 of the front door 13 and the rear door 16, the lower edge of the roof garnish 47 is pressed downward due to the pressure of the deploying airbag 21, thus releasing the engagement with the weather strip 46, and the airbag 21 deploys downward within the occupant compartment through the opening so formed.

As shown in FIG. 6, at the position of the center pillar 12, the lower edge of the roof garnish 47 is pressed downward due to the pressure of the deploying airbag 21, thus releasing the engagement with the upper end of the center pillar garnish 53, and the airbag 21 deploys downward within the occupant compartment through the opening so formed.

Since the center pillar garnish 53 covering a side face, on the occupant compartment side, of the center pillar 12 is fixed to the front bracket 50 and not to the center pillar 12, even when the upper part of the center pillar 12 is deformed relative to the roof side rail 18 because of a vehicle side collision, there is little change in the positional relationship between the center pillar garnish 53 and the airbag 21 supported in the upper part of the front bracket 50. This arrangement, together with secure fixing of the center pillar garnish 53 to the front bracket 50 by means of the latches 53a rather than by a clip, makes it difficult for the deploying airbag 21 to catch on the upper end of the center pillar garnish 53, thereby guaranteeing reliable deployment of the airbag 21.

Moreover, since the deploying airbag 21 is guided obliquely downward toward the occupant compartment along the tilted guide surface 52a of the projection 52 of the front bracket 50, the airbag 21 can be deployed yet more smoothly while avoiding any interference with the center pillar garnish 53.

As shown in FIG. 7, at the position of the rear pillar 15, the lower edge of the roof garnish 47 is pressed downward due to the pressure of the deploying airbag 21, thus releasing the engagement with the upper end of the rear pillar garnish 61, and the airbag 21 deploys downward within the occupant compartment through the opening so formed. At this time, since the deploying airbag 21 is guided obliquely downward toward the occupant compartment along the tilted guide surface 59a of the projection 59 of the rear bracket 57, the airbag 21 can be deployed smoothly while avoiding any interference with the rear pillar garnish 61.

Furthermore, since the position of the vicinity of the lower edge of the roof garnish 47 is determined by it being clamped from both sides between the top face 59b of the projection 59 and the flange 61a of the rear pillar garnish 61, the two flanges 47a and 61a abut each other without forming any step, thereby enhancing the appearance. Moreover, since the latches 47b of the roof garnish 47 flex and easily disengage from the flange 61a of the rear pillar garnish 61 when the airbag 21 is being deployed, it is possible to reliably form an opening between the roof garnish 47 and the rear pillar garnish 61, the airbag 21 being deployed through the opening. If the entire lower edge of the roof garnish 47 were engaged with the reverse face of the upper edge of the rear pillar garnish 61, it would become difficult to smoothly separate the lower edge of the roof garnish 47 from the upper edge of the rear pillar garnish 61 when the airbag 21 deploys.

As shown in FIG. 8, at the position of the front pillar 11, the rear edge of the front pillar garnish 64 is pressed downward due to the pressure of the deploying airbag 21, thus releasing the engagement with the weather strip 48, and the airbag 21 deploys downward within the occupant compartment through the opening so formed.

When the airbag 21 deploys toward the occupant compartment as described above, among the six end parts a to f of the cells 28a to 28f of the airbag 21, the end part b is positioned in the vicinity of the center pillar garnish 53, the end parts c and d are positioned on top of the center pillar garnish 53, and the end part e is positioned in the vicinity of the rear pillar garnish 61 as is clear from FIG. 2.

FIG. 9 shows the two end parts b and c, which are positioned in the vicinity of the center pillar garnish 53 and on top of the center pillar garnish 53 respectively. Even if the airbag 21 cannot exhibit a sufficient impact-absorbing effect in the vicinity of these non-inflatable end parts b and c, a required impact-absorbing effect can be ensured by collapse of the impact absorbing ribs 53b provided in the center pillar garnish 53 positioned behind the airbag 21. Two other end parts d and e, which correspond to the center pillar garnish 53 and the rear pillar garnish 61 respectively, can also give the above-mentioned effect.

When the acceleration caused by a side collision is equal to or less than a predetermined value, the occupant restraint system C does not operate, but when the impact causes a secondary collision between an occupant and the lower edge of the roof garnish 47 facing the roof side rail 18 or an upper part of the front pillar garnish 64, not only does the corrugated pipe impact absorbing member 33 collapse, thus absorbing the impact, but also the folded airbag 21 exhibits a function of enhancing the impact-absorbing effect. In this case, since the impact absorbing member 33 is supported so as to be in contact with the inner member 37 of the roof 34 and the inner member 41 of the front pillar 11 (see FIGS. 5 to 8), it can be reliably made to collapse by pressure from these inner members 37 and 41, thereby effectively absorbing the impact of the secondary collision.

Next, the second embodiment of the present invention is explained by reference to FIGS. 13 and 14. In the second embodiment, members corresponding to the members of the first embodiment are denoted by the same reference numerals and symbols as in the first embodiment, and duplication of the explanation is omitted.

Figure 13:
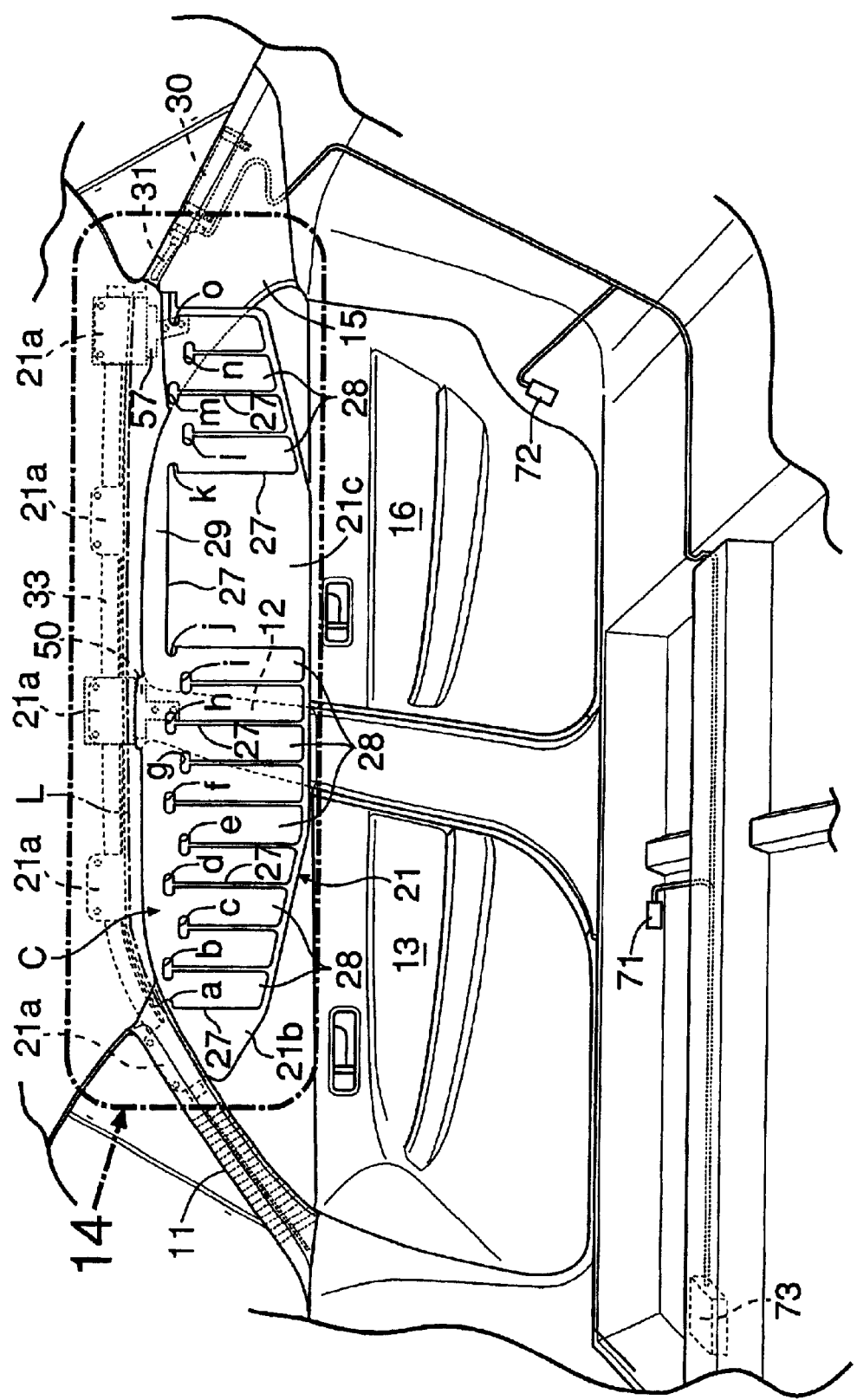
FIGS. 13 and 14 show a second embodiment of the present invention.
Figure 14:
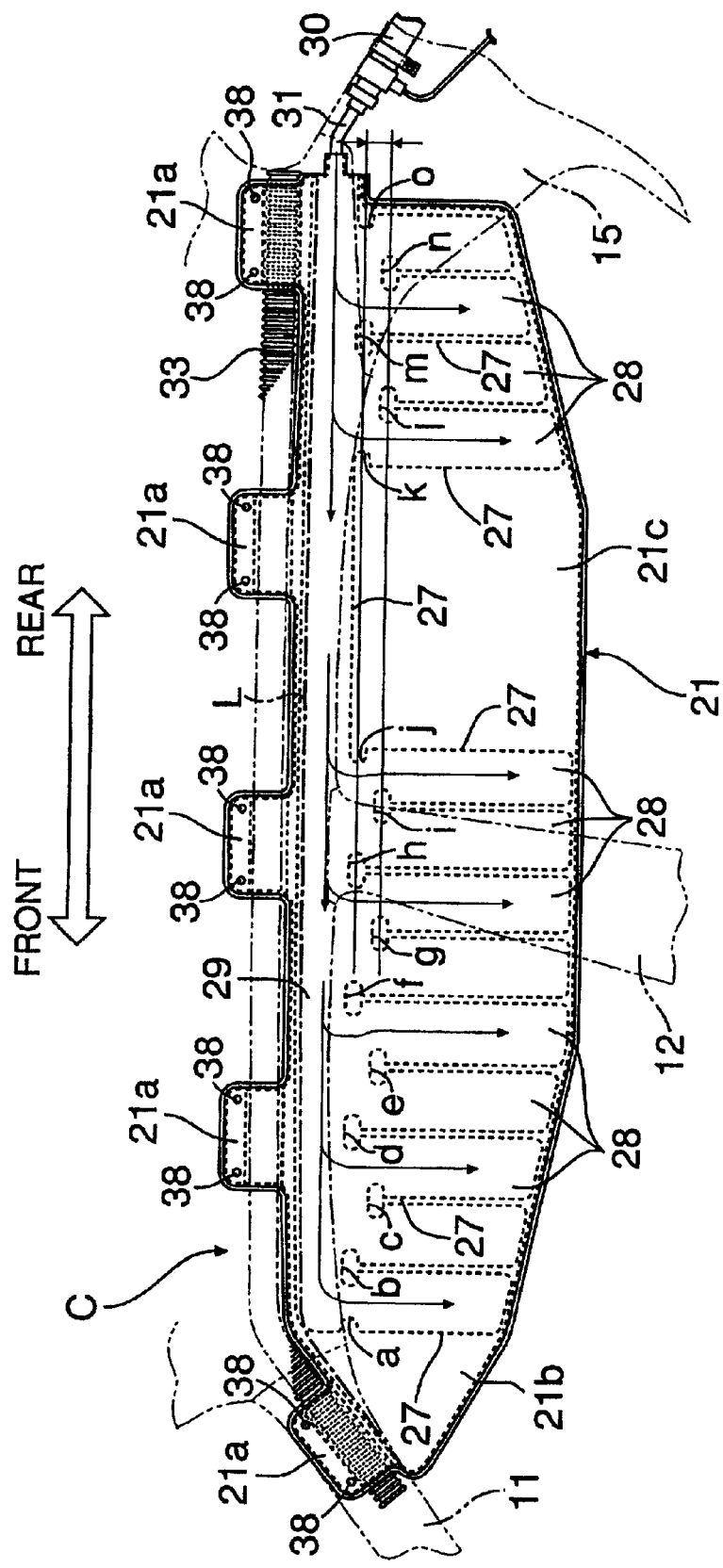

Referring to FIGS. 13 and 14, an airbag 21 extending in the longitudinal direction of the vehicle body is formed by sewing with stitching 27 a first base fabric 25 and a second base fabric 26 superimposed one on top of the other, the two having substantially the same shape (see FIG. 9). The stitching 27 forms a plurality of (for example, thirteen) cells 28 and an upper communicating passage 29. The front end of a gas supply pipe 31 extending forward from an inflator 30 housed within the rear pillar 15 is inserted within the upper communicating passage 29. The lower ends of the thirteen cells 28 branching downward from the upper communicating passage 29 are blocked. The part via which the gas supply pipe 31 is inserted within the upper communicating passage 29 is secured by means of a metal band, etc. and sealed in gas-tight manner. Positions at the upper ends of the thirteen cells 28 extending to the lower part of the upper communicating passage 29 formed along the upper edge of the airbag 21, that is, the end parts a to o of the thirteen cells 28, are not aligned relative to a fold line L of the airbag 21, but are positioned alternately at higher positions and lower positions.

The action of this embodiment is explained below.

When a vehicle side collision is detected, the inflator 30 operates, and the gas stored under pressure within the inflator 30 flows into the thirteen cells 28 via the gas supply pipe 31 and the upper communicating passage 29, thus inflating the thirteen cells 28. Inflating the airbag 21 ruptures slits 42a (see FIG. 4) of an airbag cover 42, and the airbag 21 whose restraint has been released deploys downward.

The airbag 21 folded along the fold line L starts to deploy in response to the gas flowing into the cells 28 from the upper communicating passage 29, and since the end parts a to o of the cells 28 are not vertically aligned relative to the fold line L of the airbag 21, the timing of the gas flowing into each of the cells 28 is staggered. Supplying the gas to each of the cells 28 with staggered timing in this way can prevent all of the cells 28 from bending in a V-shape at the middle in the vertical direction, thereby smoothly deploying the airbag 21.

Figure 15:
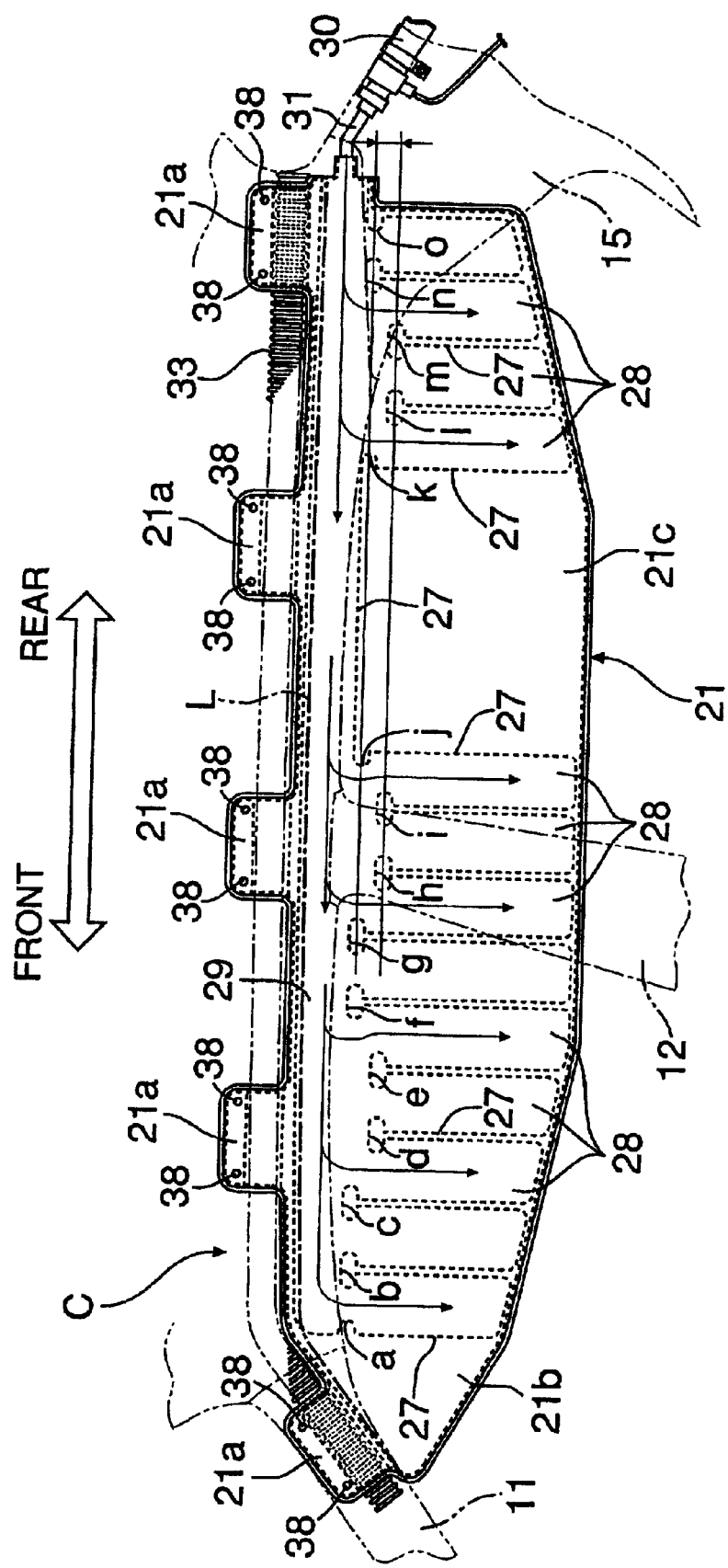
FIG. 15 shows a third embodiment of the present invention and is a view corresponding to FIG. 14.

Next, the third embodiment of the present invention is explained by reference to FIG. 15.

In the airbag 21 of the second embodiment, the end parts a to o of the thirteen cells 28 are positioned alternately up and down, but in an airbag 21 of the third embodiment, pairs of end parts a to o of thirteen cells 28 are positioned alternately up and down. This third embodiment can also achieve the same effect as the second embodiment.

Figure 16:
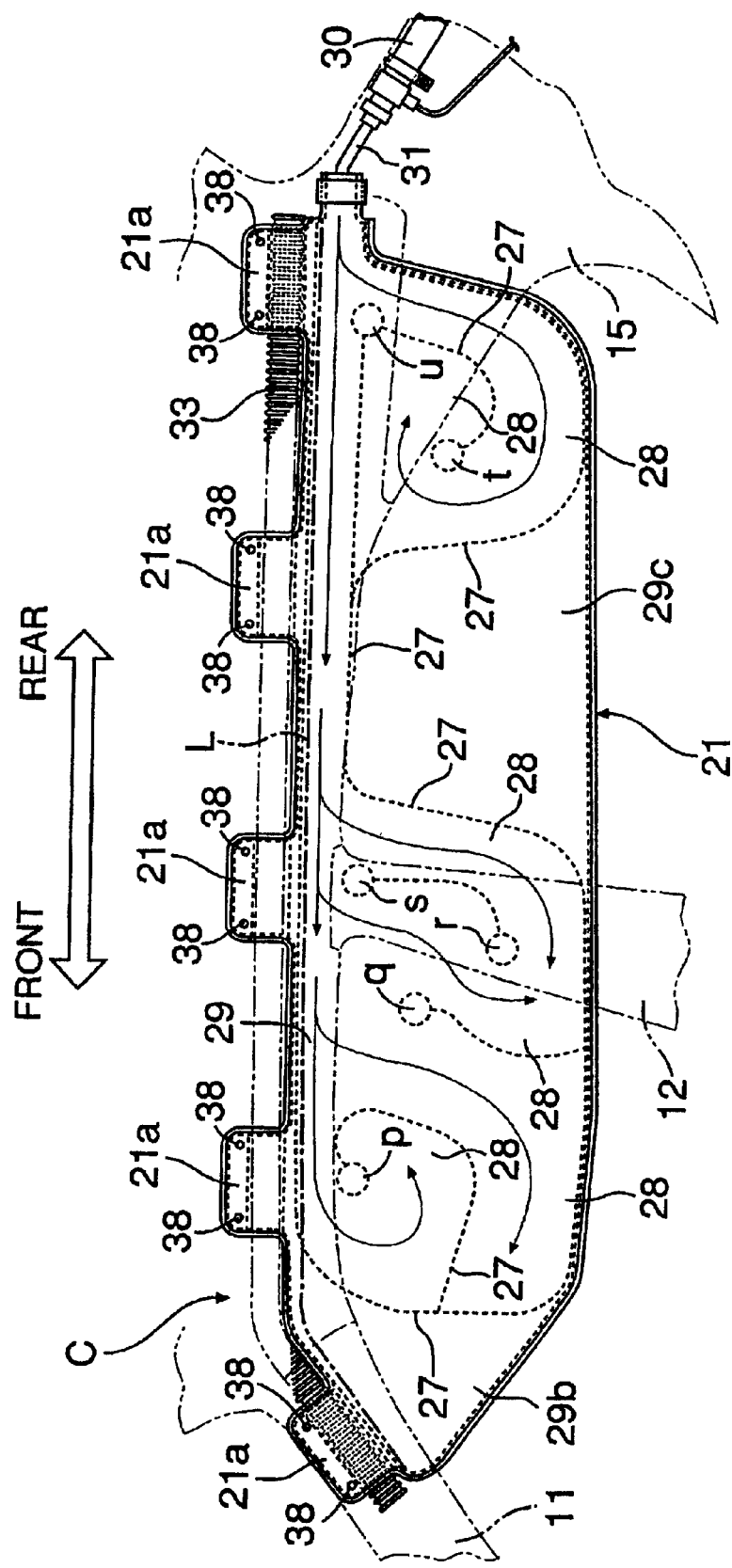
FIG. 16 shows a fourth embodiment of the present invention and is a view corresponding to FIG. 14.

Next, the fourth embodiment of the present invention is explained by reference to FIG. 16.

In the airbags 21 of the second and third embodiments, the cells 28 are formed in a tube shape extending vertically, but cells 28 of an airbag 21 of the fourth embodiment are formed in a J-shape or a U-shape by curved lines of stitching 27, and the end parts p to u of these cells 28 are not vertically aligned relative to a fold line L of the airbag 21. This fourth embodiment can also achieve the same effect as the second and third embodiments.

Although embodiments of the present invention are explained in detail above, the present invention can be modified in a variety of ways without departing from the spirit and scope of the present invention.

For example, the shape of the cells 28a to 28f, 28 of the airbag 21 are not limited to those of the embodiments, and any shape can be employed. Furthermore, in the embodiments, the connecting part of the airbag 21 is formed from the stitching 27, but it may be formed by adhesion or Jacquard weaving (seamless).

What is claimed is:

1. An occupant restraint system in a vehicle, said system comprising:

an airbag that is disposed in a folded state along an upper edge of a door opening of a vehicle body;

an inflator in the vehicle comprising a gas generator which generates a gas when the vehicle is involved in a collision, the gas operable to inflate the airbag so that the airbag is deployed in a curtain shape along an inner face of a side of an occupant compartment; and at least one impact absorbing member;

wherein in the deployed configuration thereof, the airbag comprises a plurality of cells that are defined by a connecting part and are inflated by the gas generated by the inflator, said impact absorbing member comprises a structurally reinforced pillar garnish which is formed with impact absorbing ribs on a face thereof opposite from said occupant compartment, and at least one end parts of the cells is positioned in the vicinity of said impact absorbing member.

2. The occupant restraint system of claim 1, wherein said cells are non-parallel to one another in the deployed configuration of the airbag.

3. The occupant restraint system of claim 1, wherein the airbag further comprises an upper communicating passage in the deployed configuration thereof, said upper communicating passage being in fluid communication with each of said cells.

4. The occupant restraint system of claim 1, wherein the airbag has a reinforced area formed by stitching sewn in the shape of a loop adjacent an end portion of each of said cells.

5. An occupant restraint system in a vehicle, said system comprising:

an airbag that is disposed in a folded state along an upper edge of a door opening of a vehicle body; and an inflator comprising a gas generator which generates a gas when the vehicle is involved in a collision, the gas inflating the airbag so that the airbag is deployed in a curtain shape along an inner side face of an occupant compartment;

wherein the airbag comprises a plurality of cells that are inflated by the gas generated by the inflator, and wherein end parts of the cells are non-vertically aligned relative to a fold line of the airbag, the fold line corresponding to an upper edge of the airbag and extending in the longitudinal direction of the vehicle such that timing of the gas generated by the inflator flowing into each of said cells is staggered.

6. The occupant restraint system of claim 5, wherein said cells are non-parallel to one another in the deployed configuration of the airbag.

7. The occupant restraint system of claim 5, wherein the airbag further comprises an upper communicating passage in the deployed configuration thereof, said upper communicating passage being in fluid communication with each of said cells.

8. The occupant restraint system of claim 5, wherein the airbag has a reinforced area formed by stitching sewn in the shape of a loop adjacent an end portion of each of said cells.

9. An occupant restraint system comprising:

a side airbag for placement in a folded state along an upper edge of a door opening of a vehicle body;

an inflator comprising a gas generator which generates a gas when the vehicle is involved in a collision, the gas inflating the airbag so that the airbag is deployed in a curtain shape along an inner side face of an occupant compartment; and at least one impact absorbing member for installation in said vehicle adjacent the airbag;

wherein the airbag comprises a plurality of cells that are defined by a connecting part and are inflatable by the gas generated by the inflator, said impact absorbing member comprises a structurally reinforced pillar garnish which is formed with impact absorbing ribs on a face thereof opposite from said occupant compartment, and when the airbag is deployed, at least one end part of the cells is positioned in the vicinity of said impact absorbing member.

10. The occupant restraint system of claim 9, wherein said cells are non-parallel to one another in the deployed configuration of the airbag.

11. The occupant restraint system of claim 9, wherein the airbag further comprises an upper communicating passage in the deployed configuration thereof, said upper communicating passage being in fluid communication with each of said cells.

12. The occupant restraint system of claim 9, wherein the airbag has a reinforced area formed by stitching sewn in the shape of a loop adjacent an end portion of each of said cells.

13. An occupant restraint system comprising:

a side airbag for placement in a folded state along an upper edge of a door opening of a vehicle body; and an inflator comprising a gas generator which generates a gas when the vehicle is involved in a collision, the gas inflating the airbag so that the airbag is deployed in a curtain shape along an inner side face of an occupant compartment;

wherein the airbag comprises a plurality of cells that are inflatable by the gas generated by the inflator, and upon deployment of the airbag, the cells comprise end parts that are non-vertically aligned relative to a fold line of the airbag, the fold line corresponding to an upper edge of the airbag and extending in the longitudinal direction of the vehicle such that timing of the gas generated by the inflator flowing into each of said cells is staggered.

14. The occupant restraint system of claim 13, wherein said cells are non-parallel to one another in the deployed configuration of the airbag.

15. The occupant restraint system of claim 13, wherein the airbag further comprises an upper communicating passage in the deployed configuration thereof, said upper communicating passage being in fluid communication with each of said cells.

16. The occupant restraint system of claim 13, wherein the airbag has a reinforced area formed by stitching sewn in the shape of a loop adjacent an end portion of each of said cells.

17. The occupant restraint system of claim 5, wherein the end parts of said cells are positioned alternately at higher positions and lower positions relative to said fold line of the airbag.

18. The occupant restraint system of claim 13, wherein the end parts of said cells are positioned alternately at higher positions and lower positions relative to said fold line of the airbag.

* * * * *

UNITED STATES PATENT AND TRADEMARK OFFICE
CERTIFICATE OF CORRECTION

PATENT NO. : 6,843,502 B2  
DATED : January 18, 2005  
INVENTOR(S) : Takashi Aoki et al.

It is certified that error appears in the above-identified patent and that said Letters Patent is hereby corrected as shown below:

Column 4,
Line 12, change "member support 21 a" to -- member support 21a --.

Column 9,
Line 9, change "parts of the cells" to -- part of the cells --.

Signed and Sealed this

Sixteenth Day of August, 2005

JON W. DUDAS
*Director of the United States Patent and Trademark Office*